(12) United States Patent
Blair et al.

(10) Patent No.: US 10,425,322 B2
(45) Date of Patent: Sep. 24, 2019

(54) SCALABLE BROADBAND METRO NETWORK ARCHITECTURE

(71) Applicant: Ciena Corporation, Hanover, MD (US)

(72) Inventors: Loudon T. Blair, Severna Park, MD (US); Joseph Berthold, Whitehouse Station, NJ (US); Michael Y. Frankel, Baltimore, MD (US); John P. Mateosky, West River, MD (US)

(73) Assignee: Ciena Corporation, Hanover, MD (US)

( * ) Notice: Subject to any disclaimer, the term of this patent is extended or adjusted under 35 U.S.C. 154(b) by 385 days.

(21) Appl. No.: 14/684,483

(22) Filed: Apr. 13, 2015

(65) Prior Publication Data

US 2016/0301593 A1 Oct. 13, 2016

(51) Int. Cl.
*H04L 12/751* (2013.01)
*H04L 12/66* (2006.01)
*H04L 12/891* (2013.01)
*H04L 12/46* (2006.01)
*H04L 12/24* (2006.01)
*H04L 12/715* (2013.01)

(52) U.S. Cl.
CPC .............. *H04L 45/02* (2013.01); *H04L 41/50* (2013.01); *H04L 45/64* (2013.01)

(58) Field of Classification Search
None
See application file for complete search history.

(56) References Cited

U.S. PATENT DOCUMENTS 7,068,873 B2 6/2006 Frankel et al.
7,415,208 B1 8/2008 Haggans et al.
8,054,840 B2 11/2011 Booth et al.
8,456,984 B2 6/2013 Ranganathan et al.
8,467,375 B2 6/2013 Blair
(Continued)

FOREIGN PATENT DOCUMENTS

EP 1585262 A1 10/2005

OTHER PUBLICATIONS

Velasco et al., Network & Service Virtualization, A Service-Oriented Hybrid Access Network and Clouds Architecture, IEEE Communications Magazine, Apr. 8, 2015, pp. 159-165.*
(Continued)

*Primary Examiner* — Jason E Mattis
*Assistant Examiner* — Hong Shao
(74) *Attorney, Agent, or Firm* — Clements Bernard Walker PLLC; Christopher L. Bernard; Lawrence A. Baratta, Jr.

(57) ABSTRACT

A data center utilizing an architecture minimizing Internet Protocol (IP) routing therein includes one or more service edge network elements located in the data center, wherein a sub-IP network communicatively couples the one or more service edge network elements to one or more customer edge network elements located at or near demarcation points between a customer edge network and a service provider network, wherein the one or more customer edge network elements and the one or more service edge network elements are configured to provide direct user access to the data center for a plurality of users; and a control system communicatively coupled to the one or more service edge network elements and the sub-IP network, wherein the control system is configured to control resources on the sub-IP network and the data center for the plurality of users.

19 Claims, 5 Drawing Sheets

(56) References Cited

U.S. PATENT DOCUMENTS

| | | |
|---|---|---|
| 8,625,994 B2 | 1/2014 | Archambault et al. |
| 8,849,115 B2 | 9/2014 | Blair et al. |
| 2008/0075071 A1 | 3/2008 | Beshai |
| 2009/0074414 A1 | 3/2009 | Miles et al. |
| 2012/0226824 A1 | 9/2012 | Trnkus et al. |
| 2012/0321310 A1 | 12/2012 | Spock et al. |
| 2013/0108259 A1 | 5/2013 | Srinivas et al. |
| 2013/0108263 A1 | 5/2013 | Srinivas et al. |
| 2013/0108264 A1 | 5/2013 | deRuijter et al. |
| 2013/0259465 A1 | 10/2013 | Blair |
| 2013/0287397 A1 | 10/2013 | Frankel et al. |
| 2014/0105600 A1 | 4/2014 | Dahlfort et al. |
| 2014/0153924 A1 | 6/2014 | deRuijter |
| 2014/0270762 A1 | 9/2014 | Li et al. |
| 2015/0076923 A1 | 3/2015 | Frankel et al. |
| 2015/0088827 A1* | 3/2015 | Xu .................... G06F 3/0605 707/634 |

OTHER PUBLICATIONS

Sep. 1, 2016 International Search Report issued in International Patent Application No. EP 16164907.

Velasco et al., Network & Service Virtualization, A Service-Oriented Hybrid Access Network and Clouds Architecture, IEEE Communications Magazine, Apr. 2015, pp. 159-165.

Matsumoto, Craig, "Calient Pitches Optical Aid for the Data Center," SDNCentral, Mar. 11, 2014, pp. 1-5.

Farrington, et al., "Helios: A Hybrid Electrical/Optical Switch Architecture for Modular Data Centers," University of California, San Diego, pp. 1-12.

Xia, et al., "SDN and Optical Flow Steering for Network Function Virtualization," Ericsson Research Silicon Valley, San Jose, CA, pp. 1-2.

* cited by examiner

SCALABLE BROADBAND METRO NETWORK ARCHITECTURE

FIELD OF THE DISCLOSURE

The present disclosure generally relates to broadband network architectures. More particularly, the present disclosure relates to scalable broadband metro network architecture systems and methods, which are efficient and scalable to provide broadband services to customers.

BACKGROUND OF THE DISCLOSURE

Traffic on broadband networks continues to grow, such as driven by video content. Two contributors to video traffic growth are the bit-rate growth of individual streams as their resolution increases and the growth in the number of unique streams carried by a network as broadcast content consumption is replaced by unicast content consumption. Specifically, as more users (customers, subscribers, etc.) "cut the cord," they resort to streaming content from various Over-the-Top (OTT) content providers. Of course, there is other content which contributes to the growth. Often the content, including the video content, is sourced from the Internet, outside of service providers' network domains. Service providers have been unable to increase Internet access revenue as average bandwidth has grown, so to maintain profitability they need to reduce their network costs continually. Conventionally, service providers have a number of solutions available to increase access bandwidth and reduce the cost per bit of broadband service delivery. A number of these conventional solutions are based on fundamental improvements in the capacity and cost of transmission and switching technology, and have resulted in orders of magnitude improvement in the cost/bit for delivering broadband services in the past. However, exponentials have a way of catching up, and service providers are now experiencing more difficulty in delivering sufficient network cost savings relying strictly on equipment cost savings, and need to seek fundamental architectural change.

There are various conventional approaches to the scalability and cost problems service providers face.

First, transmission capacity has scaled through Dense Wave Division Multiplexing (DWDM) and spectral efficiency improvements which provide conventional systems on the order of 10 Tb/s capacity, with an additional factor of 2 to 3× for metro distances. However, conventional DWDM transmission technology, limited in the spectrum by the optical amplifier passband, is approaching Shannon's limit. Increasing transmission symbol constellation complexity increases spectral efficiency and therefore system capacity, but maximum transmission distance becomes severely limited, even for the relatively short distances in the metro.

Second, switching capacity has scaled with relative simple packet switching circuitry (e.g., Application-Specific Integrated Circuits (ASICs) approaching 3.2 Tb/s chip input/output (I/O). More complex and more scalable switching systems, such as Internet Protocol (IP) routers, with the ability to manage large numbers of flows, require more complex ASICs and buffer memory and come with significantly higher cost and power. For example, at the time of writing, simple packet switching ASICs targeted at data center top-of-rack (TOR) switching are approaching I/O bandwidth of 3.2 Tb/s and fit in a 1 Rack Unit (RU) switch form factor, primarily limited by the I/O faceplate density. The platforms service providers require, because of requirements on the granularity of flow management, modularity, scalability, and built-in redundancy, have much lower density, and, therefore, higher cost/bit. IP routers are even less dense, and, therefore, more costly than packet-optical solutions. As switching ASICs increase in scale their cost/bit improves, but their total power dissipation increases, which presents a density and, therefore, cost challenge.

Third, there is a trend towards network convergence with the functional integration of transmission and switching. This integration can include Packet-Optical Transport Systems (POTS), IP/DWDM integration, etc. The integration seeks to remove external interfaces thereby reducing network cost. However, the integration does compromise overall density, i.e., integration of coherent transmission in metro switching platforms, either POTS or IP/DWDM, limits the switching system density that can be achieved, and presents a further cost and scalability challenge.

Fourth, there is a trend towards higher-level functional integration such as where switches and routers include integrated devices supporting such functions as distributed transparent content caching, Broadband Network Gateway (BNG), and servers to host virtual network functions. The value here is the removal of separate pieces of networking, processing, and storage equipment by reassigning functions to integrated host devices. For example, BNG modules are added to router platforms for subscriber management applications in some service provider networks. Transparent caches for popular video content have been widely studied but have proven less cost-effective the closer to the edge of the network they are deployed. These solutions are costly to implement and are not able to scale efficiently with the growth in user-to-content traffic demand. Most caching continues to prove effective in centralized locations, such as major Internet peering centers or hub data centers in Tier 1, 2 or 3 markets.

Fifth, network elements forming service provider networks are trending towards commoditization. Service providers are picking up on a trend started by the operators of mega-scale data centers to procure "white-box" switches or "bare metal" switches and servers. This commoditization has led to an effort to develop designs for open-source switching hardware.

Sixth, Software Defined Networking (SDN) is evolving to separate control and data planes, and this has significant momentum among service providers. SDN has also been applied to the optical layer.

Finally, network functions are being virtualized through Network Function Virtualization (NFV). Since, server processing power and I/O bandwidth continue to increase, many network functions now residing in stand-alone network appliances that are hosted on virtual machines within processors in a data center. Besides hardware cost savings, this trend brings substantial operational costs savings.

The approaches above can be applied within the context of the existing network architecture, with service providers replacing network components, as improved versions are available. Broadband access networks are inherently distributed entities, distributing and collecting traffic from hundreds of thousands to millions of endpoints in a major market (i.e., residences, businesses and mobile towers). This is achieved by a number of tiers of aggregation/distribution switches between the user and a regional gateway to the Internet. The first six items in the list above can be applied to the switches and transmission links in this distributed network. The seventh item above, NFV, could be applied as a box-by-box replacement for some functions in the distributed access/aggregation network described above, but greater economies of scale and operational simplicity can be achieved by placing them in centralized data centers within a market area. Limiting the number of these data centers to a small fraction of the number of central offices in use today reduces the number of physical locations housing complex equipment to manage, greatly reducing operational costs.

Thus, generally speaking, service providers are expected to maintain the same transport and switching architecture in the Wide Area Network (WAN) network, but plan to replace a number of network functions with virtual network functions hosted in data centers. Conventionally, IP routers perform an integrated aggregation and IP routing function. These IP routers typically operate over separate optical transport equipment. Further, existing data centers are currently operated independently from the metro or wide area networks (MAN or WANs), resulting in inefficient handoff between the network and the data center, typically at the expensive IP network layer.

One innovation in data center architecture that has some relevance to the problem described here is the hybrid packet-optical architecture. There are conventional approaches to hybrid packet-optical data center networks that are not new. For example, the Helios architecture described a hybrid packet-optical solution to enable high-capacity optical links between top-of-rack switches (Farrington, Nathan, et al. "Helios: a hybrid electrical/optical switch architecture for modular data centers" ACM SIGCOMM Computer Communication Review 41.4 (2011): 339-350). More recently, this approach has been developed as a commercial offering called Optical Aid (by Calient and Packetcounter). Plexxi also promotes a commercial data center network fabric that combines packet and optical (electrical cross-point) switches to enable dynamically reprogrammable interconnection between changing communities of interest that Plexxi calls Affinities. Ericsson's SOLuTIoN (SDN-based OpticaL Traffic steering for NFV) architecture also promotes a hybrid packet-optical approach. In Ericsson's design, they separate servers into two groups that are accessed via either (i) an optical switch for high-bandwidth traffic or (ii) a packet switch for fine granularity traffic. In this approach, an aggregation router located outside the data center is used to pre-sort IP-routed user traffic into the two groups associated with packet switching and optical switching inside the data center.

Typically, when optical switches are considered for use in a data center, such as described in the Helios approach, the application is to support large flows (sometimes described as 'elephant' flows) that would disrupt the efficiency of the existing packet network. The research challenge, as yet unsolved, is the automatic detection and timely configuration of optical resources in a general-purpose data center. The Plexxi solution, which implements a Helios-type architecture, does not solve the problem of sensing flows, but depends on the modeling of data center workflows to determine customized interconnection architectures. Following this modeling, incremental links between packet switches are configured to allow improved performance and efficiency in an interconnect configuration that is otherwise blocking. It is costly to implement fully non-blocking interconnects within large data centers. Also, in all cases, the optical switches are located in the data center and are not implemented as a distributed switch across the WAN.

BRIEF SUMMARY OF THE DISCLOSURE

In an exemplary embodiment, a data center utilizing an architecture minimizing Internet Protocol (IP) routing therein includes one or more service edge network elements located in the data center, wherein a sub-IP network communicatively couples the one or more service edge network elements to one or more customer edge network elements located at or near demarcation points between a customer edge network and a service provider network, wherein the one or more customer edge network elements and the one or more service edge network elements are configured to provide direct user access to the data center for a plurality of users; and a control system communicatively coupled to the one or more service edge network elements and the sub-IP network, wherein the control system is configured to control resources on the sub-IP network and the data center for the plurality of users. The direct user access for the plurality of users is performed without IP routed connectivity into the data center thereby minimizing IP control plane routing in the data center. Virtual Network Functions (VNFs) implemented on a server can be configured to implement some or all of the one or more customer edge network elements and the one or more service edge network elements. Virtual Network Functions (VNFs) implemented on a server can be configured to act as virtualized Broadband Network Gateways (vBNGs) in the data center are configured to implement the one or more service edge network elements. The sub-IP network can be a multilayer network connecting the plurality of users to the data center, wherein traffic flows on the sub-IP network for the plurality of users can be aggregated and groomed within the multilayer network into aggregate connections destined for a specific device within the data center, through the control system.

The sub-IP network can utilize the data plane of one or more of wavelengths, Optical Transport Network (OTN), Ethernet, IP forwarding in Software Defined Networking (SDN), Multiprotocol Label Switching (MPLS), and MPLS-Transport Profile (MPLS-TP) to connect the plurality of users to the one or more service edge network elements in the data center. Traffic flows from the plurality of users can be aggregated into larger and larger aggregate connections from the customer edge network to the data center. The sub-IP network can further include one or more reconfigurable add/drop multiplexers configured to terminate the larger and larger aggregate connections inside the data center and to direct bandwidth to a specific device within the data center. The control system can have inputs of policy, traffic estimates and measurements, server utilization estimates and measurements, and network state both outside and inside the data center, and the control system can utilize the inputs to assign network and data center resources including connectivity on the sub-IP network based on the inputs. The control system can include one of a Software Defined Networking (SDN) controller or an orchestration controller. The control system can be configured to control multilayer grooming on the sub-IP network for the plurality of users into the data center such that large groomed traffic flows are routed optically, from a point in an access/aggregation network where an optical channel utilization threshold is reached up to a device within the data center.

In another exemplary embodiment, a method to minimize Internet Protocol (IP) routing in a data center using direct user access includes controlling aggregation and grooming of traffic flows associated with a plurality of users on a sub-IP network, wherein the plurality of users are configured to access the data center directly via the sub-IP network; receiving the traffic flows on the sub-IP network in an aggregate connection with the traffic flows contained therein; and providing the traffic flows to devices in the data center, wherein the devices includes switches or servers, and wherein the aggregation and grooming of the traffic flows is based in part on the destinations of the traffic flows. The method can further include terminating the aggregate connection inside the data center on the sub-IP network and directing the traffic flows bandwidth to the devices. The traffic flows can terminate on the servers in the data center hosting Virtual Network Functions (VNFs) configured to act as virtualized Broadband Network Gateways (vBNGs). The sub-IP network can be a multilayer network connecting the plurality of users to the data center, wherein traffic flows for the plurality of users are aggregated and groomed into aggregate connections destined for a specific device within the data center, through the controlling. The sub-IP network can utilize the data plane of one or more of wavelengths, Optical Transport Network (OTN), Ethernet, IP forwarding in Software Defined Networking (SDN), Multiprotocol Label Switching (MPLS), and MPLS-Transport Profile (MPLS-TP) to connect the plurality of users to the one or more service edge network elements in the data center. The method can further include receiving inputs of policy, traffic estimates and measurements, server utilization estimates and measurements, and network state both outside and inside the data center; and assigning network and data center resources including connectivity on the sub-IP network based on the inputs. The controlling can be performed by one of a Software Defined Networking (SDN) controller or an orchestration controller. The controlling can be configured to control multilayer grooming on the sub-IP network for the plurality of users into the data center such that large groomed traffic flows are routed optically, from a point in an access/aggregation network where an optical channel utilization threshold is reached up to a device within the data center.

In a further exemplary embodiment, a customer edge domain in a network configured to minimize Internet Protocol (IP) routing in a data center includes one or more customer edge network elements located at or near demarcation points between the customer edge domain and a service provider network, wherein the one or more customer edge network elements are configured to provide direct user access to the data center for a plurality of users along with one or more service edge network elements in the data center through a sub-IP network communicatively coupling the one or more customer edge network elements to the one or more service edge network elements in the data center, wherein a control system from the data center is configured to control resources on the sub-IP network and in the data center for the plurality of users. The control system can be configured to control multilayer grooming on the sub-IP network for the plurality of users into the data center such that large groomed traffic flows are routed optically, from a point in an access/aggregation network where an optical channel utilization threshold is reached up to a device within the data center.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1A:
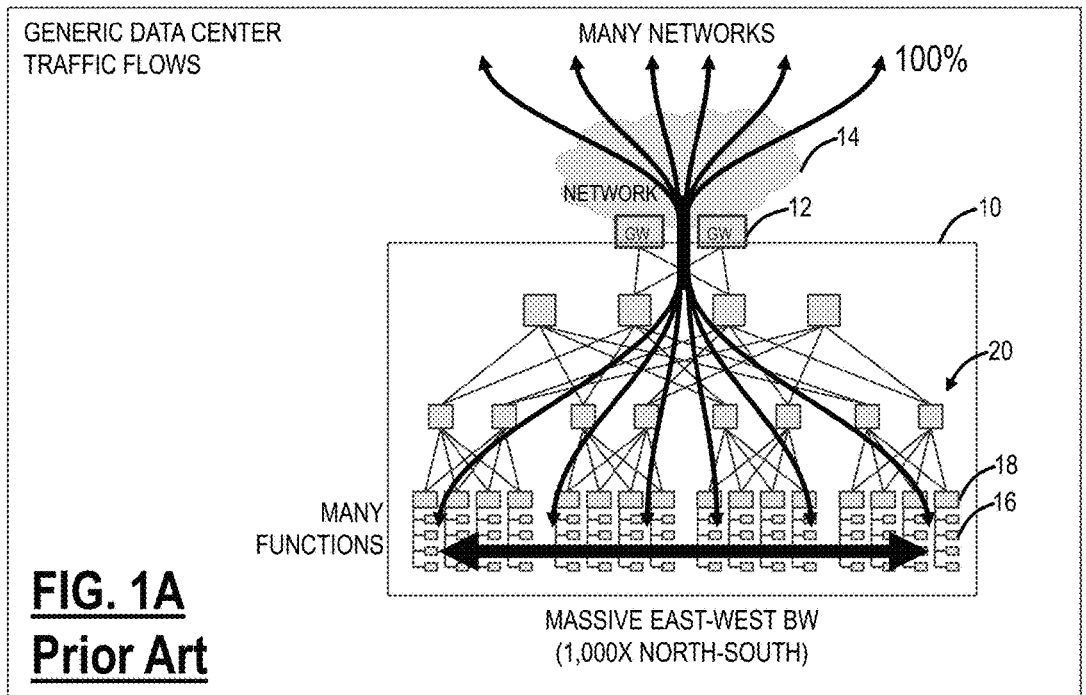
FIGS. 1A and 1B are network diagrams of an exemplary data center 10 in both a conventional implementation (FIG. 1A) and with the systems and methods described herein (FIG. 1B)

In various exemplary embodiments, scalable broadband metro network architecture systems and methods are described providing broadband services to subscribers. The scalable broadband metro network architecture provides a novel solution for providing large numbers of subscribers in a geographic area with access to broadband services, providing a direct user access scheme to data centers which significantly offloads the service provider's IP network. The network architecture includes various network and computer resources, including:

A programmable network interface device (NID) located at or near the customer demarcation point providing a user edge connection to the service provider's IP network;

The same programmable network interface device (NID) containing a server capable of hosting a wide variety of applications dedicated to the user;

The same server providing an extension of the data center control domain, including data encapsulations and allowing the insertion of customer and service specific metadata;

A programmable, dynamic sub-IP multilayer network connecting the local subscriber community to a (service provider) data center that performs aggregation and grooming of service traffic flows into aggregate connections, such as DWDM wavelengths, Optical Transport Network (OTN) containers, and/or packet tunnels, destined for a specific top-of-rack (TOR) switch, another type of data center switch, or server within a (service provider) data center. As described herein, sub-IP means using protocols at Layers 0, 1, and/or 2, not Layer 3 (IP) for routing. That is, sub-IP means performing communication functions without using a routed IP network;

A programmable, dynamic sub-IP layer network within the (service provider) data center connecting the aggregated and groomed large granularity ingress links (user-to-content links) directly to a top-of-rack (TOR) switch or server;

A server that performs virtual functions such as virtual switch, the function of a Data Center Gateway (DC-GW) device, Broadband Network Gateway (BNG), and IP router for the subscribers assigned to that server, etc.;

Egress links from the same server connecting to a hybrid packet-optical network within the (service provider) data center, with connectivity to other servers within the (service provider) data center and to the wide area network (WAN); and A control system that takes as input policy, traffic estimates and measurements, server utilization estimates and measurements, network state both outside and inside the data center, and uses this information to assign users to network and data center server resources, and to optimize the routing and cost of the multilayer network from the user edge to the data center.

The scalable broadband metro network architecture systems and methods integrate network and data center functions into a self-contained solution that takes advantage of the cost per bit economics of multi-layer packet-optical networking technologies and shortcuts the data center network to provide dedicated access to servers hosting the first point of service provider subscriber management. This network architecture results in a major simplification of the access, aggregation, and metro core networks that provide broadband services today by eliminating many complex and high cost service touch-points and replacing them with a simpler and more scalable packet-optical network that aggregates and grooms flows to aggregate connections, then expresses those aggregate connections directly to servers that host key Virtualized Network Functions, such as the Broadband Network Gateway (BNG) function, in a data center where there are significant economies of scale.

Figure 1B:
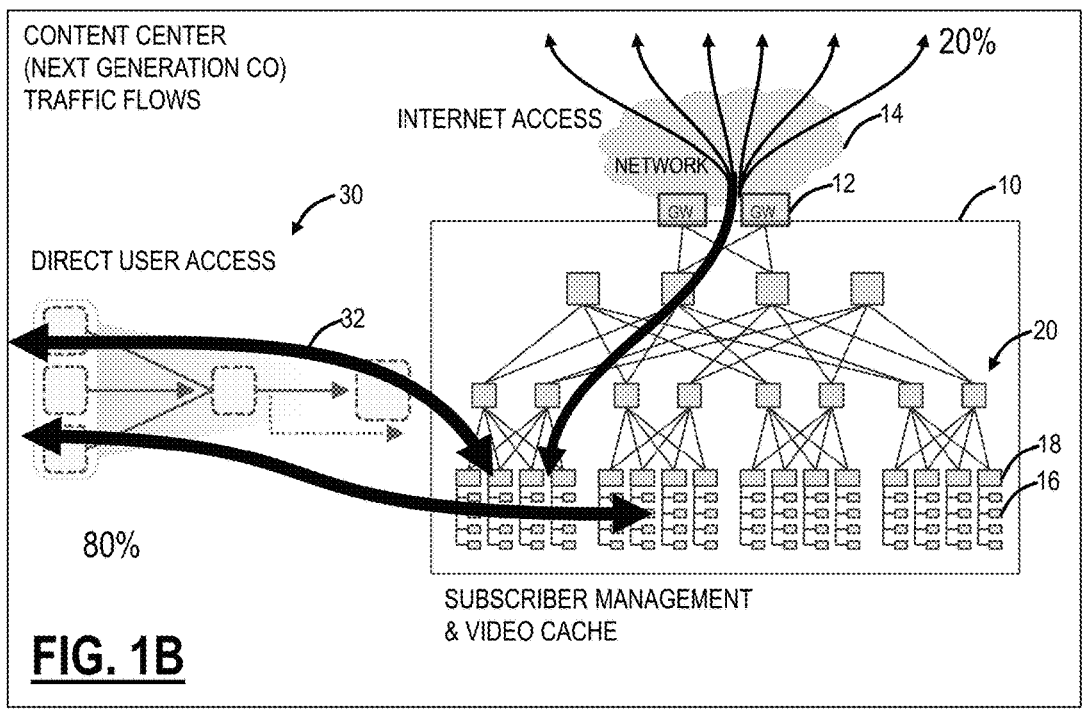

Referring to FIGS. 1A and 1B, in an exemplary embodiment, network diagrams illustrate an exemplary data center 10 in both a conventional implementation (FIG. 1A) and with the systems and methods described herein (FIG. 1B). The data center 10 includes a hierarchical structure with gateway (GW) routers 12 at the top connecting the data center 10 to a WAN 14, e.g., the Internet, etc. One common design assumption for carrier data centers is that the service provider will adopt data center physical architectures and operating models similar to FIG. 1A. A general principle of modern data center architecture is the existence of a computing virtualization environment, where virtual machines are treated as logical entities and can be placed on any server 16 in the data center 10. This leads to very structured and modular physical designs, commonly with several servers 16 in an equipment rack, interconnected to a TOR switch 18, which is then interconnected to one or more tiers of switching 20 in a fat-tree or folded Clos switch topology to ensure statistically non-blocking connections between any pairs of servers 16.

The data center gateway routers 12 sit at the top of this hierarchy, managing connectivity to the WAN 14. The gateway routers 12 are conventionally large IP routing devices and in the conventional architecture of FIG. 1A, all traffic flows through the data center 10 ingress/egress into the hierarchical structure through these gateway routers 12 which is configured to ensure traffic flows are sent to the appropriate server 16. The interconnection network (the one or more tiers of switching 20 and the TOR switches 18) within the data center 10 must be dimensioned to support any server-to-server connectivity required, and any WAN-to-server connectivity required. The larger the number of servers 16 in the data center 10, the larger the number of switching 20 tiers needed to provide statistically non-blocking connectivity.

In FIG. 1B, traffic flows to/from a next generation central office are very predictable and need not follow the convention in FIG. 1A where all traffic traverses the gateway routers 12. Specifically, next generation traffic flows are dominated by video content as described herein. For example, it has been estimated that around 80% of future traffic flowing to/from a data center located at a next generation central office that has direct connectivity to broadband users, can be categorized as subscriber management and cache resources for video and other services. The scalable broadband metro network architecture systems and methods propose a direct user access scheme 30, which differs substantially from the all user access to the gateway routers 12 in FIG. 1A. First, supporting the increased video content, etc. in the architecture of FIG. 1A would simply require larger and larger IP networks in the data center 10, i.e., massive increases in the one or more tiers of switching 20 and the TOR switches 18. This does not scale and is cost prohibitive. With the scalable broadband metro network architecture systems and methods, specific user traffic flows 32 are brought in via the "side door", through the direct user access scheme 30, separately from the IP network 14, the traditional gateway router 12, the one or more tiers of switching 20 and the TOR switches 18. The specific user traffic flows 32 can be directly terminated on Virtual Network Functions (VNFs) for subscriber management on the servers 16. Again, this removes a large amount of traffic from the IP network and directly brings users to appropriate ports in the data center 10.

This "side door" direct user access scheme 30 and VNF termination of the specific user traffic flows 32, from aggregate connections, can utilize a dedicated port(s) or access point(s) at a data center demarcation point, e.g., with a set of dedicated Network Interface Controllers (NICs) and switch infrastructure. Note, this direct user access scheme 30 is used in combination with the gateway routers 12 and the associated IP network connectivity in the data center 10. Specifically, the direct user access scheme 30 minimizes the usage of the gateway routers 12. In various subsequent descriptions, the direct user access scheme 30 describes servers or switches as terminating the specific user traffic flows 32. Note, in addition, the specific user traffic flows 32 can terminate on optical switches, such as described in FIG. 5, i.e., using a reconfigurable electrical switch with redundant ports could accomplish the required metro/regional interface/signal termination, along with switching and cross-point re-routing and enhanced connectivity, providing redundant East-West and North-South connectivity, to augment the existing Layer 2 switching tree. Also, of note, the "side-door" aggregated user-to-content specific user traffic flows 32 tend to have a more "nailed up" nature to them from a connectivity point-of-view inside the data center 10. This also presents additional fibers to manage and terminate, but the reconfigurable electrical switch can provide a dense, scalable solution toward that end.

Figure 2:
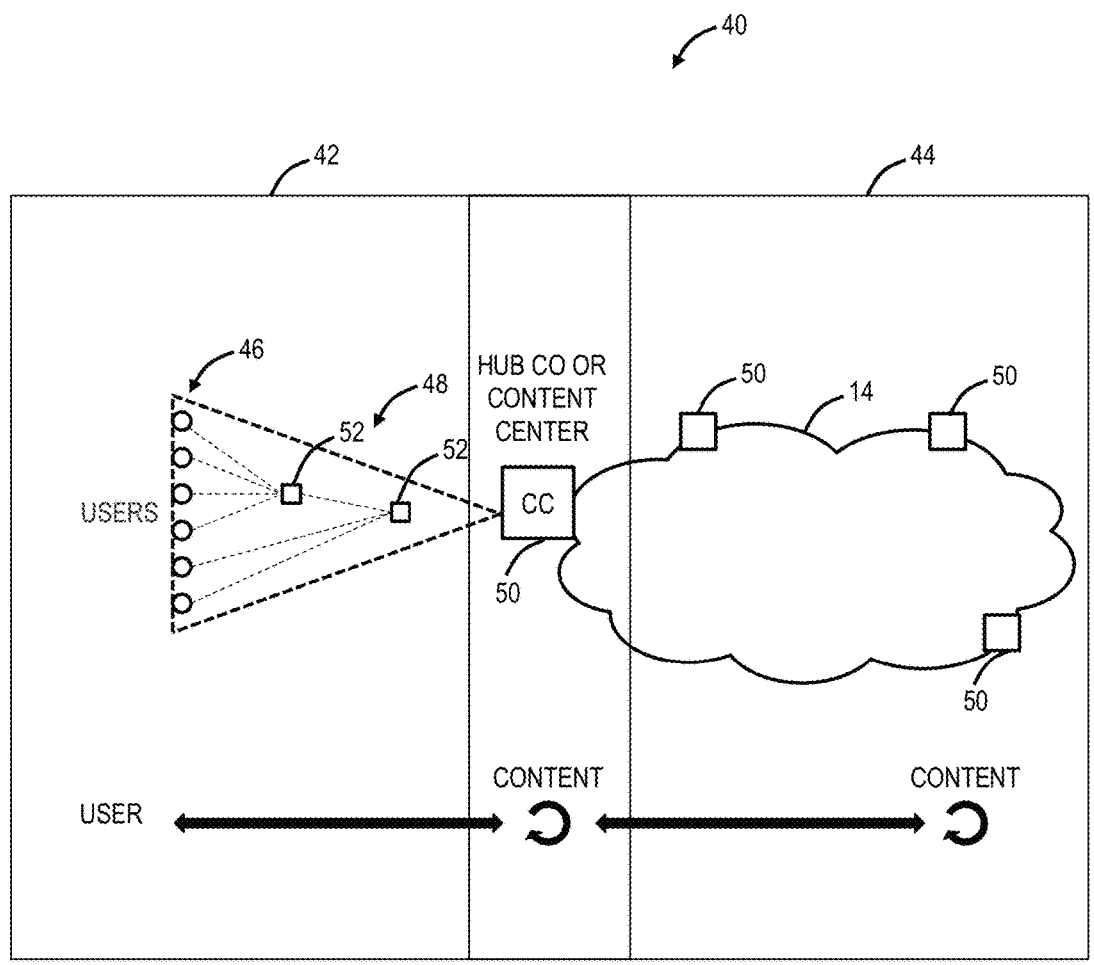
FIG. 2 is a network diagram of a network with a user-content network domain and a content-content network domain.

Referring to FIG. 2, in an exemplary embodiment, a network diagram illustrates a network 40 with a user-content network domain 42 and a content-content network domain 44. The user-content network domain 42 includes a plurality of users 46, which are aggregated, such as in local or aggregate Central Offices (COs) 48 into a hub CO or content center 50. The content center 50 includes the data center 10. The users 46 can include, without limitation, enterprises, organizations, residential users, broadband consumers, mobile users, and the like. The users 46 can include any access technology, such as, without limitation, fiber (Passive Optical Network (PON), fiber-to-the-X, access fiber networks, etc.), cable/Multiple-System Operator (MSO), Digital Subscriber Loop (DSL), wireless, etc. The users 46 can be aggregated at multiple points from their access to the content center 50 through various transport aggregation devices 52 which can include, without limitation, switches, routers, DSL Access Multiplexers (DSLAMs), optical systems, etc. The content-content network domain 44 includes the WAN 14 interconnecting multiple content centers 50. The scalable broadband metro network architecture systems and methods focus on the user-content network domain 42.

The traffic flows from the users 46 are aggregated with the transport aggregation devices 52 to fill up various aggregate connections (i.e., pipes) destined for the content center 50. The pipes can include, without limitation, wavelengths, OTN containers, Ethernet connections, Multiprotocol Label Switching (MPLS) and MPLS-Transport Profile (MPLS- TP) connections, and the like. In the conventional architecture of FIG. 1A, larger and larger pipes are being seen which are eventually terminated on the gateway routers 12 and then routed appropriately. In contrast, the direct user access scheme 30 proposes to intelligently construct the pipes in the user-content network domain 42, bring them in the "side door" of the content center 50, and directly terminate the traffic flows from the users 46 on an appropriate server 16, i.e., VNF, etc.

The direct user access scheme 30 solves the scalability problem in the IP network through a fully automated solution that delivers flexible, cost efficient, scalable connectivity between the users 46 and the first point of subscriber management (for example, through a virtualized Broadband Network Gateway (vBNG) on one of the servers 16) within the service provider's data center 10/content center 50. The direct user access scheme 30 makes substantial simplifications to current data center network architectures (see FIG. 1A) by eliminating the costs of routers, data center gateways, and large-scale multitier non-blocking packet fabrics within the data center supporting connectivity to the network edge. Note, in various descriptions herein, the direct user access scheme 30 describes the connectivity of the users 46 to the data center 10. Of course, those of ordinary skill in the art will recognize this connectivity is also between the data center 10 and the users 46, i.e., bidirectional traffic.

Figure 3:
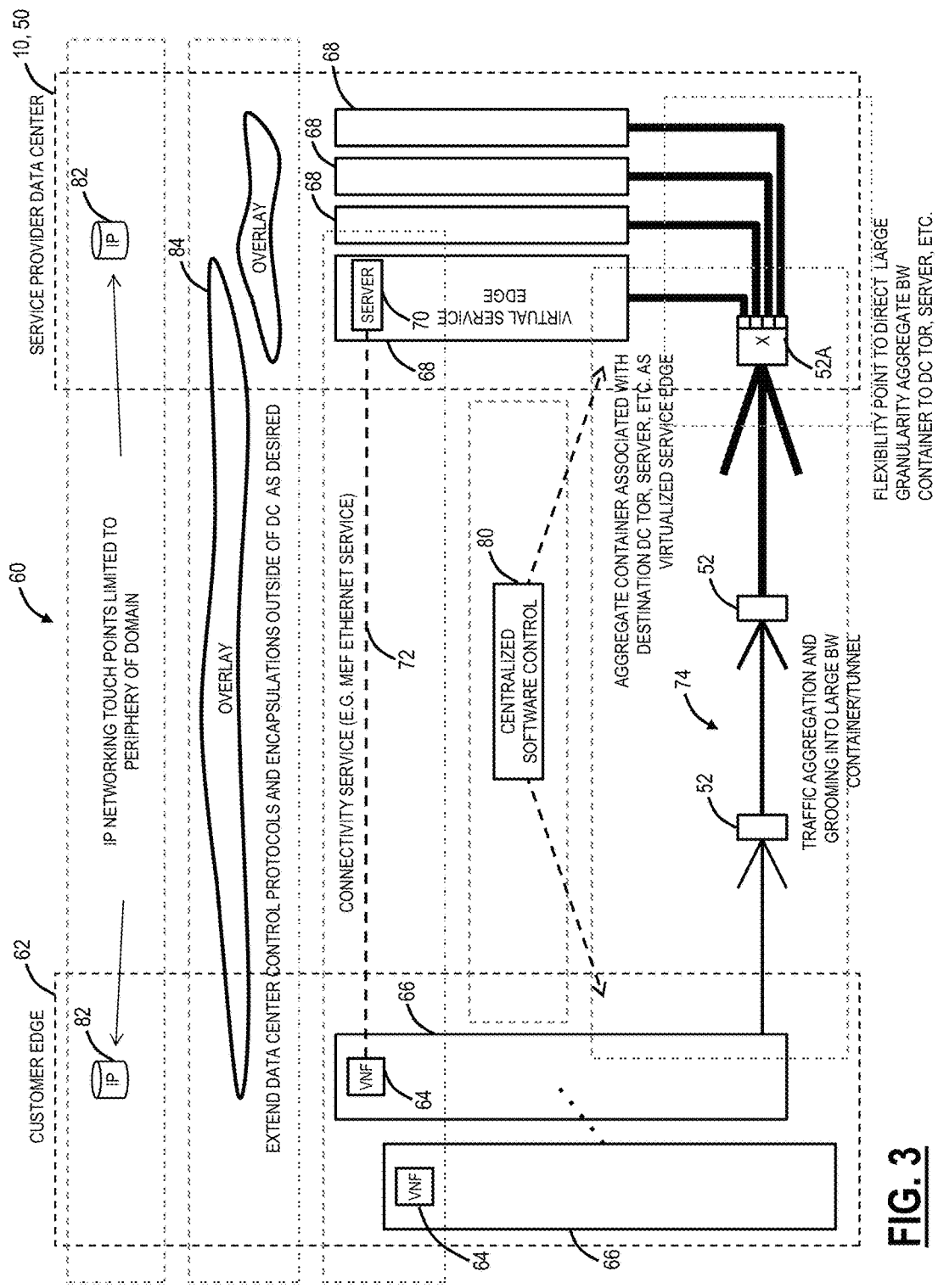
FIG. 3 is a network diagram of a scalable broadband network architecture realizing the direct user access scheme from FIG. 2.

Referring to FIG. 3, in an exemplary embodiment, a network diagram illustrates a scalable broadband network architecture 60 for realizing the direct user access scheme 30. The scalable broadband network architecture 60 includes a customer edge 62 and the data center 10 (or content center 50). The customer edge 62 is a demarcation point for the users 46 and can be located on the customers' premises or in the local or aggregate COs 48, through the transport aggregation devices 52, etc. At the customer edge 62, the scalable broadband network architecture 60 includes a processor capable of hosting virtual network functions (VNFs) 64 and networking applications at or near the customer-network demarcation point, providing a programmable customer edge network element 66. The VNFs 64 are hosted on virtual machines (VMs) on a server which is located in programmable network interface devices (NID) located at or near the customer demarcation point providing a connection from the customer edge 62 to the service provider's network, i.e., the data center 10/content center 50. The VNFs 64 are capable of hosting a wide variety of applications dedicated to the users 46.

The programmable customer edge network element 66 connects to a service edge network element 68, which can be virtual and located on a server 70 in the data center 10/content center 50, through connectivity services 72. The connectivity services 72 reside below the IP networking layer (since the scalable broadband network architecture 60 is offloading the IP network), and can include, for example, Metro Ethernet Forum (MEF) specified Ethernet services or the like. Examples of functions that the server 70 can perform include the function of gateway router 12, Broadband Network Gateway (BNG), and IP router for the subscribers assigned to that server 70.

A visualization of traffic aggregation is shown on a sub-IP network 74 where traffic is aggregated from large groups of users 46 and brought closer to the (service provider) data center 10/content center 50, and where the traffic is groomed into larger bandwidth containers or tunnels, via the transport aggregation devices 52, all the way up to full wavelength-sized (or multi-wavelength) containers. The aggregate connection is associated with a destination data center rack, server 70, or virtual machine assigned to a service edge network element 68. As a result of the centralized control of multilayer grooming from the customer edge 62 to the data center 10/content center 50, large groomed traffic flows can be routed optically, from the point in the access/aggregation network where an optical channel utilization threshold is reached, all the way to the TOR switch 18, or even to a server 16, via optical network elements 52A. The servers 70 can be connected via a hybrid packet-optical network within the (service provider) data center 10/content center, with connectivity to other servers 70 and the WAN 14. Note, while the TOR switch 18 or the server 16 is described herein as the destination of the aggregate connections on the sub-IP network 74, these destinations can be any switch or device in the data center 10 that is not the traditional gateway router 12. For example, the destination may include a leaf switch that is located above the TOR switch 18, but below a spine switch. The destination may also be to a pool of servers, etc.

The aggregate connections on the sub-IP network 74 can also include protection as well, at any layer (e.g., optical/DWDM protection, TDM layer protection, etc.). Also, the aggregate connection possibly could be sent to different data centers 10, 50. For survivability reasons, an aggregate connection may be carried on diverse paths to a single data center 10, 50 (e.g., on a ring or mesh network, etc.). Alternatively, at a Wide Area Network (WAN) aggregation point, an operator may choose to send the aggregate connection to one of multiple different physical data centers 10, 50 in order to load balance traffic across different servers (e.g., maybe by day of the week). This might use a Bandwidth on Demand (BOD) approach based on scheduling. Alternatively, the WAN aggregation point may be operated by an operator who is different from the data center 10, 50 operator. In this case, one set of traffic (subscribers A) may be aggregated into an aggregate connection A and sent to operator A's data center 10, 50. Another set of traffic (subscribers B) may be aggregated into aggregate connection B and sent to operator B's data center 10, 50.

The connectivity services 72 operate over the sub-IP network 74 which can be a programmable, dynamic sub-IP multilayer network connecting the users 46 to the data center 10/content center 50. As described herein, sub-IP means using protocols at Layers 0, 1, and/or 2, not Layer 3 (IP) for routing. That is, sub-IP means performing communication functions without using a routed IP network. Note, in an SDN-controlled environment, packets can be forwarded in the data plane based on any packet label (e.g., Ethernet Media Access Control (MAC), MPLS label, IP address, etc.). In SDN, sub-IP may include IP forwarding in the data plane since it is not burdened by the control plane overhead associated with the IP and MPLS protocols. The sub-IP network 74 can include data plane aggregate connections based on DWDM wavelengths, Time Division Multiplexing (TDM) containers, and/or packet tunnels (where the tunnels may use Ethernet MAC, IP addresses, MPLS labels, or variations). Aggregation and grooming are performed for service traffic flows into aggregate connections destined for a specific TOR switch 18 or server 16 within the data center 10/content center 50 on the sub-IP network 74. Again, the aggregate connections can include DWDM wavelengths, Optical Transport Network (OTN) containers, and/or packet tunnels. The size of the aggregate connection will depend on the bandwidth accommodated by the terminating device in the data center. For example, today's server 16 may terminate at 10 Gb/s moving to 25 Gb/s, and onwards. A TOR switch 18 may terminate the aggregate connection at 40 Gb/s today moving to 100 Gb/s, etc. The sub-IP network 74, within the (service provider) data center 10/content center 50, connects aggregated and groomed large granularity ingress links (user-to-content links) directly to the TOR switch 18 or server 16. The sub-IP network 74 is formed by sub-IP networking equipment, including the transport aggregation devices 52, the optical network element 52A, the customer edge network element 66, and the service edge network element 68.

Collectively, all of the sub-IP networking equipment from the customer edge 62 to the data center 10, at packet (e.g. Ethernet or MPLS/MPLS-TP), sub-wavelength (e.g. OTN or FlexEthernet), and optical channel layers, is under centralized software control system 80 and can dynamically change connectivity as network conditions change, or as changes are needed in data center resource assignments. The centralized software control system 80 can be implemented in a processor, server, etc., and can be an SDN controller or an orchestration controller that optionally includes multiple traditional and SDN control systems. The centralized software control system 80 is configured with inputs from policy, traffic estimates and measurements, server utilization estimates and measurements, network state both outside and inside the data center. The centralized software control system 80 uses these inputs to assign the users 46 to network and data center server resources, and to optimize the routing and cost of the multilayer network from the customer edge 62 to the data center 10.

Between the users 46, the customer edge 62, and the data center 10/content center 50, the scalable broadband network architecture 60 limits the locations of IP networking functionality (IP routers 82) and service specific "touch points" to the processors at or near the customer edge 62, i.e., the customer edge network element 66, and at the service edge network element 68, where they benefit from economies of scale as well as continuous hardware cost and performance improvements. Specifically, the scalable broadband network architecture 60 provides significant cost reduction and scalability improvements through the elimination of traditional IP routers from the access/aggregation network (between the customer edge 62 and the data center 10/content center 50). Instead, the IP routers 82 are replaced with an SDN-controlled packet-optical infrastructure, i.e., the sub-IP network 74 utilizes the SDN-controlled packet-optical infrastructure, for the sub-IP networking equipment.

In the sub-IP network 74, network links are designed, and capacity assigned, with overall knowledge of the users 46 and services the network needs to support, with preplanned actions in place in the event of network faults or maintenance. Within the (service provider) data center 10/content center 50, the optical network element 52A can be a large granularity switch that provides a point of flexibility to groom aggregated service traffic flows destined for a specific TOR switch 18 interface or server 16 interface within a (service provider) data center 10/content center 50, where the bandwidth of the aggregate grooming and the destination interface are compatible with the bandwidth of the aggregate connection (e.g., 10 Gb/sec, 25 Gb/sec, etc.). Also, in an exemplary embodiment, as the data center 10/content center 50 and customer edge 62 are under the control of the service provider it is possible to extend data center control protocols and data encapsulations out to the programmable customer edge, effectively creating a single distributed operating environment, as an overlay 84. For the overlay 84, the server 70 provides an extension of the control domain associated with the data center 10/content center 50, including data encapsulations and allowing the insertion of customer and service specific metadata.

In an exemplary embodiment, a data center 10 (which could also be referred to as a content center 50) with an architecture minimizing Internet Protocol (IP) routing therein includes one or more service edge network elements 68 located in the data center 10; a sub-IP network 74 communicatively coupling the one or more service edge network elements 68 to one or more customer edge network elements 66 located at or near demarcation points between a customer edge 62 network and a service provider network, wherein the one or more customer edge network elements 66 and the one or more service edge network elements 68 are configured to provide direct user access 30 to the data center 10 for a plurality of users 46; and a control system 80 communicatively coupled to the one or more service edge network elements 68 and the sub-IP network 74, wherein the control system 80 is configured to control resources on the sub-IP network 74 and the data center 10 for the plurality of users 46. The direct user access 30 is performed without IP connectivity for the plurality of users 46 into the data center 10 thereby minimizing IP routing in the data center 10. Some or all of the one or more customer edge network elements 66 and the one or more service edge network elements 68 are Virtual Network Functions (VNFs) 64 implemented on a processor or server 70. The one or more service edge network elements 68 are Virtual Network Functions (VNFs), which may be configured to act as virtualized Broadband Network Gateways (vBNGs) in the data center 10, for example.

The sub-IP network 74 can be a multilayer network connecting the plurality of users 46 to the data center 10, wherein traffic flows for the plurality of users 46 are aggregated and groomed into aggregate connections destined for a specific top-of-rack (TOR) switch 18 or server 16 within the data center 10, through the control system 80. The sub-IP network 74 utilizes one or more of wavelengths, Optical Transport Network (OTN), Ethernet, Multiprotocol Label Switching (MPLS), and MPLS-Transport Profile (MPLS-TP) to connect the plurality of users 46 to the one or more service edge network elements 68 in the data center 10. Traffic flows from the plurality of users 46 can be aggregated into larger and larger containers or tunnels from the customer edge 62 network to the data center 10, and wherein the sub-IP network 74 can further include one or more reconfigurable electrical switches 200 configured to terminate the larger and larger containers or tunnels inside the data center 10 and to direct bandwidth to a specific top-of-rack (TOR) switch 18 or server 16 within the data center 10.

The control system 80 can have inputs of policy, traffic estimates and measurements, server utilization estimates and measurements, and network state both outside and inside the data center, and the control system 80 utilizes the inputs to assign network and data center resources including connectivity on the sub-IP network 74 based on the inputs. The control system 80 can include one of a Software Defined Networking (SDN) controller or an orchestration controller that optionally includes multiple traditional and SDN control systems. The control system 80 can be configured to control multilayer grooming on the sub-IP network 74 for the plurality of users 46 into the data center 10 such that large groomed traffic flows are routed optically, from the point in an access/aggregation network where an optical channel utilization threshold is reached up to a top-of-rack (TOR) switch 18 or server 16 within the data center 10.

Figure 4:
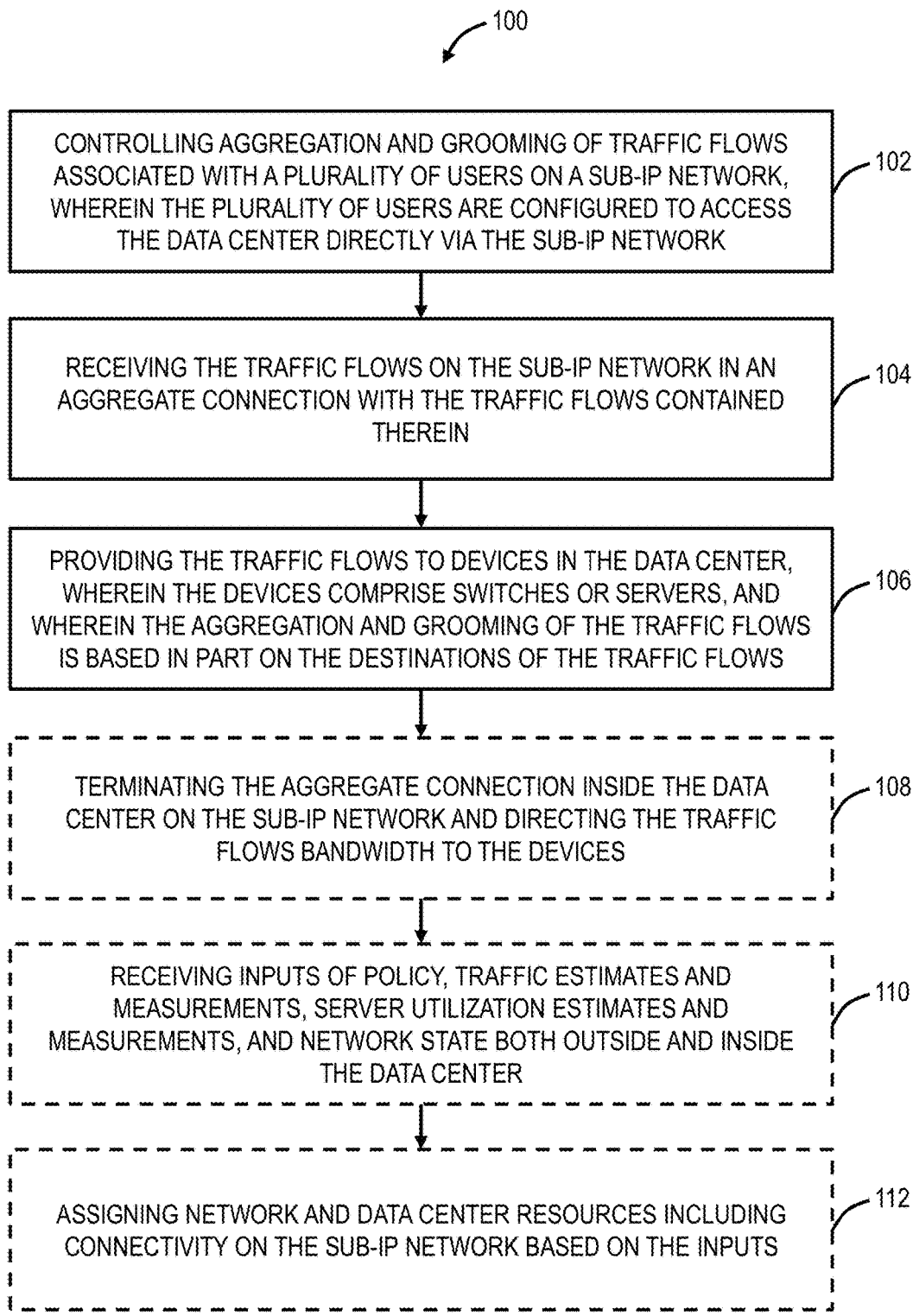
FIG. 4 is a flowchart of a process to minimize Internet Protocol (IP) routing in a data center using direct user access.

Referring to FIG. 4, in an exemplary embodiment, a flowchart illustrates a process 100 to minimize Internet Protocol (IP) routing in a data center using direct user access. The process 100 is implemented in the data center 10/content center 50, such as using the components described in FIGS. 2 and 3. The process 100 includes controlling aggregation and grooming of traffic flows associated with a plurality of users on a sub-IP network, wherein the plurality of users are configured to access the data center directly via the sub-IP network (step 102); receiving the traffic flows on the sub-IP network in an aggregate connection with the traffic flows contained therein (step 104); and providing the traffic flows to devices in the data center, wherein the devices include switches or servers, and wherein the aggregation and grooming of the traffic flows is based in part on the destinations of the traffic flows (step 106). Optionally, the process 100 includes terminating the aggregate connection inside the data center on the sub-IP network and directing the traffic flows bandwidth to the devices (step 108). Still optionally, the process 100 includes receiving inputs of policy, traffic estimates and measurements, server utilization estimates and measurements, and network state both outside and inside the data center (step 110); and assigning network and data center resources including connectivity on the sub-IP network based on the inputs (step 112).

The traffic flows can terminate on the servers in the data center hosting Virtual Network Functions (VNFs) configured to act as virtualized Broadband Network Gateways (vBNGs). The sub-IP network can be a multilayer network connecting the plurality of users to the data center, wherein traffic flows for the plurality of users are aggregated and groomed into aggregate connections destined for a specific device within the data center, through the control system. The sub-IP network can utilize one or more of wavelengths, Optical Transport Network (OTN), Ethernet, Multiprotocol Label Switching (MPLS), MPLS-Transport Profile (MPLS-TP) or other tunnel methods to connect the plurality of users to the one or more service edge network elements in the data center. The controlling step 102 can be performed by one of a Software Defined Networking (SDN) controller or an orchestration controller that optionally includes multiple traditional and SDN control systems. The controlling step 102 can be configured to control multilayer grooming on the sub-IP network for the plurality of users into the data center such that large groomed traffic flows are routed optically, from the point in an access/aggregation network where an optical channel utilization threshold is reached up to a top-of-rack (TOR) switch or server within the data center.

Figure 5:
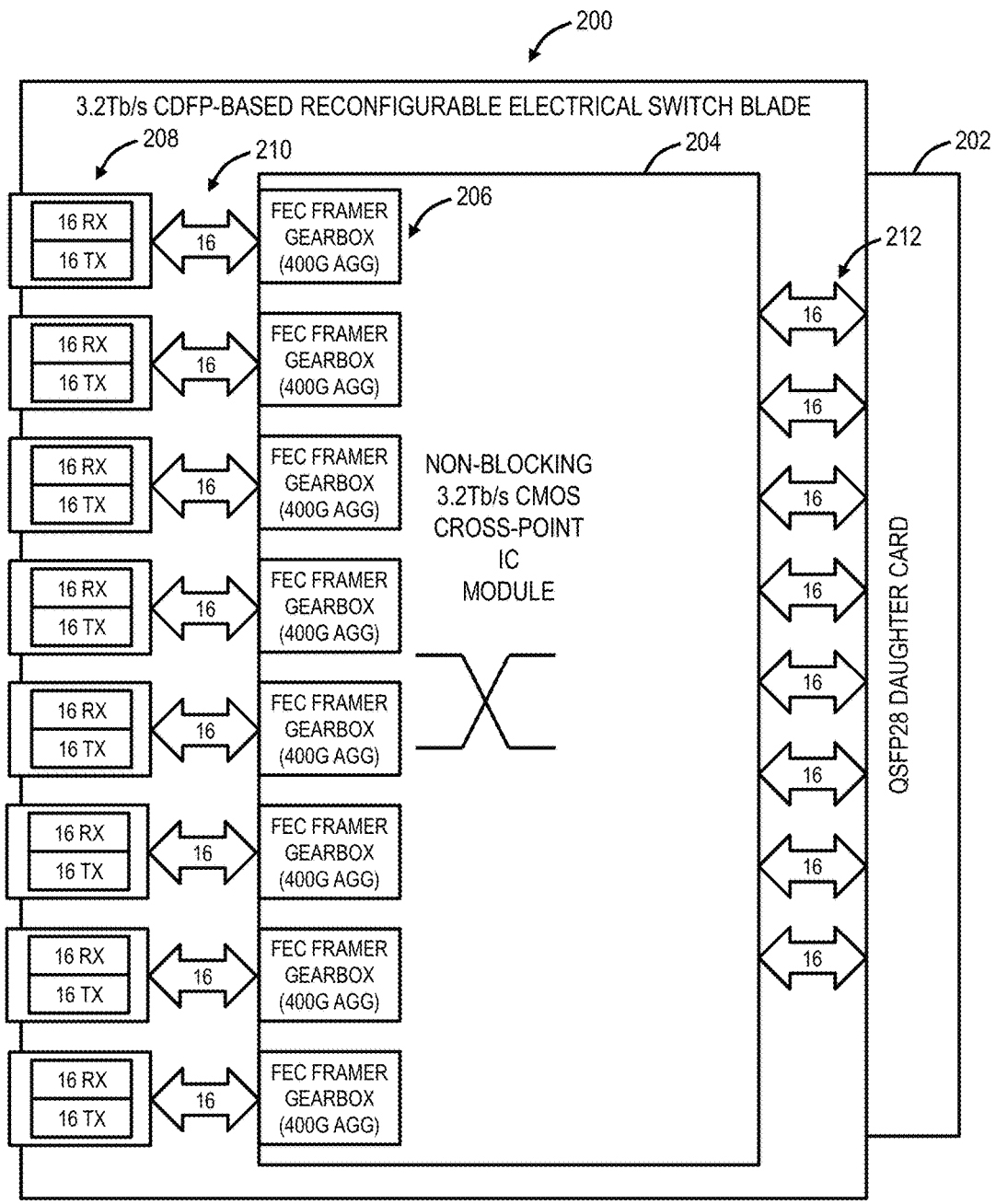
FIG. 5 is a block diagram of an exemplary implementation of a reconfigurable electrical switch configured to terminate the larger and larger aggregate connections inside the data center and to direct bandwidth within the data center.

Referring to FIG. 5, in an exemplary embodiment, a block diagram illustrates an exemplary implementation of a reconfigurable electrical switch 200 configured to terminate the larger and larger aggregate connections inside the data center 10 and to direct bandwidth to a specific top-of-rack (TOR) switch 18 or server 16 within the data center 10. The reconfigurable electrical switch 200 is shown as a blade, line card, module, etc. that can be selectively inserted into a chassis (with a daughter card 202 interfacing a backplane), or used stand-alone (without the daughter card 202). The reconfigurable electrical switch 200 is a 3.2 Tb/s CDFP-based device (CDFP is a standardized and low-cost pluggable transceiver, and any other similar form-factor, pluggable modules is also contemplated). The reconfigurable electrical switch 200 includes a 3.2 Tb/s non-blocking Complementary metal-oxide-semiconductor (CMOS) cross-point Integrated Circuit (IC) module 204. The IC module 204 can include 8 400 G Forward Error Correction (FEC) framer gearboxes 206 which interface to pluggable transceivers 208 for input/output to the reconfigurable electrical switch 200. These gearboxes 206 could also be different bit rates, such as N×100 G. The interface between the pluggable transceivers 208 and the IC module 204 can be 28 Gb/s Serializer/Deserializer (SERDES) links 210 and the interface between the IC module 204 and the daughter card 202 can be 28 Gb/s SERDES links 212.

The reconfigurable electrical switch 200 can be a Reconfigurable Electrical Add/Drop Multiplexer (READM) or any other generic cross-point switch interconnection WAN to client interfaces. Also, the reconfigurable electrical switch 200 could be replaced or work in combination with an optical switch. Specifically, the reconfigurable electrical switch 200 and/or reconfigurable optical switches can be collectively referred to as reconfigurable add/drop multiplexers. Traffic flows from the plurality of users are aggregated into larger and larger aggregate connections from the customer edge network to the data center, and the sub-IP network 74 can include one or more reconfigurable add/drop multiplexers configured to terminate the larger and larger aggregate connections inside the data center and to direct bandwidth to a specific device within the data center.

It is possible to achieve further major advances in cost and scale by introducing different switching elements, replacing high availability network elements with a high availability network made from less costly elements. Given centralized knowledge of traffic and network state, and the ability to rapidly redirect flows, high-reliability and expensive chassis-based switches can be substituted with much less expensive fixed configuration switches, such as the 3.2 Tb/s density example for the reconfigurable electrical switch 200. Current metro switching solutions cannot achieve the density just described because of the physical size and power dissipation of DWDM switch interfaces, especially coherent interfaces. The reconfigurable electrical switch 200 has shown that metro DWDM transceivers could support a 3.2 Tbs/RU switch density. Thus, the integration and the design of the reconfigurable electrical switch 200 allows an order of magnitude denser switches than are on product roadmaps over the next several years.

For transmission, the reconfigurable electrical switch 200 could also eliminate the constraint of optically amplified systems, and therefore spread signals more broadly, resulting in target fiber capacities of ~6 Tb/s, and transmission distances of <100 km. Economic analysis proved this capacity and distance adequate for more than 85% of all the links in metro networks. Also, fiber is not in short supply in the metro, and the large up-front cost of amplifiers and Reconfigurable Optical Add/Drop Multiplexers (ROADM) systems in current practice are eliminated. Scalability is achieved by lighting up additional fibers; once the 6 Tb/s fiber capacity is reached.

In one exemplary embodiment, the data center 10 described herein differs from conventional data centers because the same operator can own the user edge, the network and data center, connecting users directly to the head end of a user-to-content funnel. This provides a co-dependent solution across the whole user-to-content domain: customer (CPE)+network (WAN)+VFs (data center). A co-dependent solution such as this streamlines operations practice for the same operator.

The systems and methods described herein suit the user-content network domain 42 of the network 40 because access domain flows from the customer edge 62 to the service edge are predictable and, given this knowledge, non-blocking configurations can be easily engineered in that portion of the data center fabric. Predictability makes it efficient to have high performing special connectivity domains. When there is a need to migrate the aggregated user traffic flow from one server 70 to another within the data center 10, a high capacity switch or reconfigurable electrical switch 200 offers a low cost, low power solution within the data center 10 for traffic management.

The same silicon photonics transceivers, from the reconfigurable electrical switch 200, proposed for use in the access/aggregation network in the metro can be used on the switch interfaces facing the access network within the data center 10. One option might be to terminate these WAN links directly on a TOR switch 18 or spine switch in the data center 10, but another option is to terminate external optical interfaces on an electro-optic switching module including a simple crossbar switch such as the reconfigurable electrical switch 200. From there flows can be directed to a number of locations including direct server links, TOR links, or spine switch links. Ongoing research indicates that a module could be realized with silicon photonics transceivers integrated tightly with a 256×256 crossbar, with port rates of 25 Gb/sec. This scalable module could also act as a media converter, taking in DWDM optical signals from the WAN and distributing 100 G signals to various destinations within the data center 10.

It is clear that the general access approach of traditional data centers 10 benefits from the modular, (statistically) non-blocking architecture of the tree structure (in FIG. 1A), allowing for access to any set of virtual machines across the whole data center network. However, by partitioning the location of dedicated virtual machines to a subset of the total network, this direct user access scheme 30 removes access traffic from the aggregation and spine levels of the tree hierarchy offering a potential improvement in network efficiency and reduction in network cost (by reducing the number of devices and interfaces passed).

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic. Of course, a combination of the approaches above may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby and are intended to be covered by the following claims.

What is claimed is:

1. A data center utilizing an architecture minimizing Internet Protocol (IP) routing therein, the data center comprising:
one or more service edge network elements located in the data center, wherein a sub-IP network operating at Layers 0, 1, and 2 communicatively couples the one or more service edge network elements to one or more customer edge network elements located at or near demarcation points between a customer edge network and a service provider network, wherein the one or more customer edge network elements and the one or more service edge network elements are configured to provide direct user access to the data center for a plurality of users; and
a control system communicatively coupled to the one or more service edge network elements and the sub-IP network, wherein the control system is configured to control resources on the sub-IP network and the data center for the plurality of users,
wherein traffic flows on the sub-IP network for the plurality of users are aggregated and groomed on the sub-IP network into aggregate connections destined for a specific device comprising one of a Top of Rack (TOR) switch and a server within the data center, through the control system, and
wherein the aggregate connections are any of wavelengths, Optical Transport Network (OTN) containers, Ethernet connections, Multiprotocol Label Switching (MPLS) connections, and MPLS-Transport Profile (MPLS-TP) connections between aggregation devices in the sub-IP network and a network element in the data center, and wherein the network element in the data center is configured to connect to the specific device via the one or more service edge network elements, based on the control system.

2. The data center of claim 1, wherein Virtual Network Functions (VNFs) implemented on a server are configured to implement some or all of the one or more customer edge network elements and the one or more service edge network elements.

3. The data center of claim 1, wherein Virtual Network Functions (VNFs) implemented on a server are configured to act as virtualized Broadband Network Gateways (vBNGs) in the data center are configured to implement the one or more service edge network elements.

4. The data center of claim 1, wherein the sub-IP network is a multilayer network connecting the plurality of users to the data center, wherein traffic flows on the sub-IP network for the plurality of users are aggregated and groomed within the multilayer network into aggregate connections destined for a specific device within the data center, through the control system.

5. The data center of claim 1, wherein the sub-IP network utilizes the data plane of one or more of wavelengths, Optical Transport Network (OTN), Ethernet, IP forwarding in Software Defined Networking (SDN), Multiprotocol Label Switching (MPLS), and MPLS-Transport Profile (MPLS-TP) to connect the plurality of users to the one or more service edge network elements in the data center.

6. The data center of claim 1, wherein traffic flows from the plurality of users are aggregated into larger and larger aggregate connections from the customer edge network to the data center, and wherein the sub-IP network further comprises:
one or more reconfigurable add/drop multiplexers configured to terminate the larger and larger aggregate connections inside the data center and to direct bandwidth to a specific device within the data center.

7. The data center of claim 1, wherein the control system has inputs of policy, traffic estimates and measurements, server utilization estimates and measurements, and network state both outside and inside the data center, and the control system utilizes the inputs to assign network and data center resources including connectivity on the sub-IP network based on the inputs.

8. The data center of claim 1, wherein the control system comprises one of a Software Defined Networking (SDN) controller or an orchestration controller.

9. The data center of claim 1, wherein the control system is configured to control multilayer grooming on the sub-IP network for the plurality of users into the data center such that large groomed traffic flows are routed optically, from a point in an access/aggregation network where an optical channel utilization threshold is reached up to a device within the data center.

10. A method to minimize Internet Protocol (IP) routing in a data center using direct user access, the method comprising:
controlling aggregation and grooming of traffic flows associated with a plurality of users on a sub-IP network operating at Layers 0, 1, and 2, wherein the plurality of users are configured to access the data center directly via the sub-IP network;
receiving the traffic flows on the sub-IP network in an aggregate connection with the traffic flows contained therein; and
providing the traffic flows to devices in the data center, wherein the devices comprise switches or servers, and wherein the aggregation and grooming of the traffic flows is based in part on the destinations of the traffic flows,
wherein traffic flows on the sub-IP network for the plurality of users are aggregated and groomed on the sub-IP network into aggregate connections destined for a specific device comprising one of a Top of Rack (TOR) switch and a server within the data center, through the control system, and
wherein the aggregate connections are any of wavelengths, Optical Transport Network (OTN) containers, Ethernet connections, Multiprotocol Label Switching (MPLS) connections, and MPLS-Transport Profile (MPLS-TP) connections between aggregation devices in the sub-IP network and a network element in the data center, and wherein the network element in the data center is configured to connect to the specific device via the one or more service edge network elements, based on the control system.

11. The method of claim 10, further comprising:
terminating the aggregate connection inside the data center on the sub-IP network and directing the traffic flows bandwidth to the devices.

12. The method of claim 10, wherein the traffic flows terminate on the servers in the data center hosting Virtual Network Functions (VNFs) configured to act as virtualized Broadband Network Gateways (vBNGs).

13. The method of claim 10, wherein the sub-IP network is a multilayer network connecting the plurality of users to the data center, wherein traffic flows for the plurality of users are aggregated and groomed into aggregate connections destined for a specific device within the data center, through the controlling.

14. The method of claim 10, wherein the sub-IP network utilizes the data plane of one or more of wavelengths, Optical Transport Network (OTN), Ethernet, IP forwarding in Software Defined Networking (SDN), Multiprotocol Label Switching (MPLS), and MPLS-Transport Profile (MPLS-TP) to connect the plurality of users to the one or more service edge network elements in the data center.

15. The method of claim 10, further comprising:
receiving inputs of policy, traffic estimates and measurements, server utilization estimates and measurements, and network state both outside and inside the data center; and
assigning network and data center resources including connectivity on the sub-IP network based on the inputs.

16. The method of claim 10, wherein the controlling is performed by one of a Software Defined Networking (SDN) controller or an orchestration controller.

17. The method of claim 10, wherein the controlling is configured to control multilayer grooming on the sub-IP network for the plurality of users into the data center such that large groomed traffic flows are routed optically, from a point in an access/aggregation network where an optical channel utilization threshold is reached up to a device within the data center.

18. A customer edge domain in a network configured to minimize Internet Protocol (IP) routing in a data center, the customer edge domain comprising:
one or more customer edge network elements located at or near demarcation points between the customer edge domain and a service provider network, wherein the one or more customer edge network elements are configured to provide direct user access to the data center for a plurality of users along with one or more service edge network elements in the data center through a sub-IP network operating at Layers 0, 1, and 2 communicatively coupling the one or more customer edge network elements to the one or more service edge network elements in the data center,
wherein a control system from the data center is configured to control resources on the sub-IP network and in the data center for the plurality of users,
wherein traffic flows on the sub-IP network for the plurality of users are aggregated and groomed on the sub-IP network into aggregate connections destined for a specific device comprising one of a Top of Rack (TOR) switch and a server within the data center, through the control system, and
wherein the aggregate connections are any of wavelengths, Optical Transport Network (OTN) containers, Ethernet connections, Multiprotocol Label Switching (MPLS) connections, and MPLS-Transport Profile (MPLS-TP) connections between aggregation devices in the sub-IP network and a network element in the data center, and wherein the network element in the data center is configured to connect to the specific device via the one or more service edge network elements, based on the control system.

19. The customer edge domain of claim 18, wherein the control system is configured to control multilayer grooming on the sub-IP network for the plurality of users into the data center such that large groomed traffic flows are routed optically, from a point in an access/aggregation network where an optical channel utilization threshold is reached up to a device within the data center.

* * * * *